US012437187B2

United States Patent
Chen et al.

(10) Patent No.: US 12,437,187 B2
(45) Date of Patent: Oct. 7, 2025

(54) MRI RECONSTRUCTION BASED ON GENERATIVE MODELS

(71) Applicant: Shanghai United Imaging Intelligence Co., Ltd., Shanghai (CN)

(72) Inventors: Zhang Chen, Cambridge, MA (US); Siyuan Dong, New Haven, CT (US); Shanhui Sun, Cambridge, MA (US); Xiao Chen, Cambridge, MA (US); Yikang Liu, Cambridge, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 416 days.

(21) Appl. No.: 17/891,702

(22) Filed: Aug. 19, 2022

(65) Prior Publication Data

US 2024/0062047 A1  Feb. 22, 2024

(51) Int. Cl.
*G06N 3/047* (2023.01)
*G06N 3/045* (2023.01)

(52) U.S. Cl.
CPC ............ *G06N 3/047* (2023.01); *G06N 3/045* (2023.01); *G06T 2207/20081* (2013.01); *G06T 2207/20084* (2013.01)

(58) Field of Classification Search
CPC ........ G06N 3/047; G06N 3/045; G06N 3/088; G06N 3/084; G06T 2207/20081; G06T 2207/20084
See application file for complete search history.

(56) References Cited

U.S. PATENT DOCUMENTS

| 11,037,274 | B2* | 6/2021 | Vogels ............... G06V 10/454 |
| 2020/0265318 | A1* | 8/2020 | Malkiel .............. G06N 3/047 |
| 2020/0341094 | A1* | 10/2020 | Polak ................. A61B 5/7207 |
| 2021/0217213 | A1* | 7/2021 | Cole .................. G06N 3/088 |

(Continued)

FOREIGN PATENT DOCUMENTS

| CN | 110490947 A | 11/2019 |
| CN | 112164122 A | 1/2021 |

(Continued)

OTHER PUBLICATIONS

Guang Yang, Generative Adversarial Networks (GAN) Powered Fast Magnetic Resonance Imaging Mini Review, Comparison and Perspectives, May 2021.

(Continued)

*Primary Examiner* — Santiago Garcia
(74) *Attorney, Agent, or Firm* — Zhong Law, LLC

(57) ABSTRACT

Deep learning-based systems, methods, and instrumentalities are described herein for MRI reconstruction and/or refinement. An MRI image may be reconstructed based on under-sampled MRI information and a generative model may be trained to refine the reconstructed image, for example, by increasing the sharpness of the MRI image without introducing artifacts into the image. The generative model may be implemented using various types of artificial neural networks including a generative adversarial network. The model may be trained based on an adversarial loss and a pixel-wise image loss, and once trained, the model may be used to improve the quality of a wide range of 2D or 3D MRI images including those of a knee, brain, or heart.

18 Claims, 4 Drawing Sheets

(56) References Cited

U.S. PATENT DOCUMENTS

| | | | | |
|---|---|---|---|---|
| 2021/0264645 A1* | 8/2021 | Polak | ............... | G06N 3/045 |
| 2022/0051454 A1* | 2/2022 | Nickel | ............ | G01R 33/5611 |
| 2022/0065970 A1* | 3/2022 | Nickel | ............ | G06T 7/0016 |
| 2022/0198790 A1* | 6/2022 | Li | ............ | G06V 10/28 |
| 2022/0269906 A1* | 8/2022 | Takeda | ............ | G06T 3/4046 |
| 2022/0392122 A1* | 12/2022 | Preuhs | ............ | G06N 3/045 |

FOREIGN PATENT DOCUMENTS

| | | |
|---|---|---|
| CN | 114862984 A | 8/2022 |
| CN | 114913262 A | 8/2022 |

OTHER PUBLICATIONS

Itzik Malkiel, Conditional WGANs with Adaptive Gradient Balancing for Sparse MRI Reconstruction, May 2019.
Patrick Putzky, i-RIM applied to the fastMRI challenge, Oct. 2019.
Patrick Putzky, Invert to Learn to Invert, Nov. 2019.
Varun A. Kelkar, Compressible Latent-Space Invertible Networks for Generative Model-Constrained Image Reconstruction, Jul. 2020.
First Office Action for Chinese Application No. 202310858884.3, dated Jun. 26, 2025.
Search report for Chinese Application No. 202310858884.3, dated Jun. 26, 2025.

\* cited by examiner

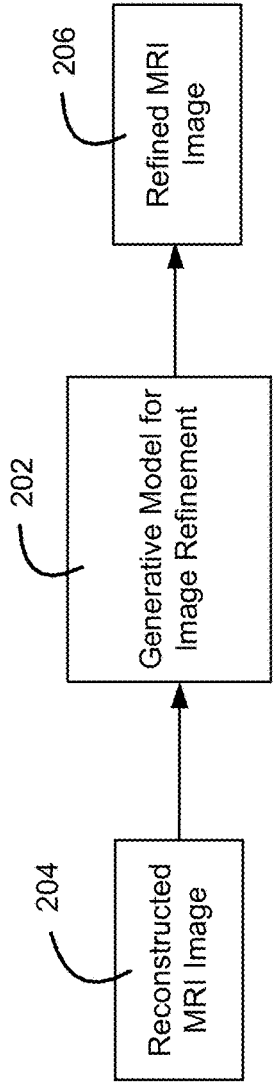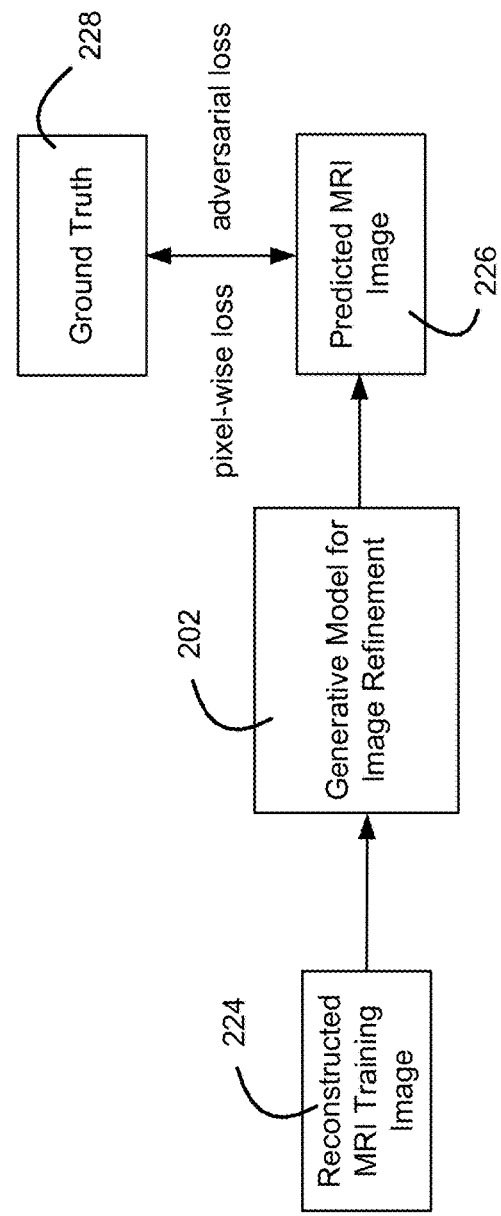
FIG. 2A
FIG. 2B

MRI RECONSTRUCTION BASED ON GENERATIVE MODELS

BACKGROUND

Magnetic resonance imaging (MRI) is an important clinical tool for issue finding, disease detection, and treatment planning. MRI data acquisition, however, is inherently slow. To accelerate the imaging process, MRI data space (e.g., which may be referred to as k-space) may be under-sampled and an MRI image may be reconstructed based on the under-sampled data. In recent years, deep learning (DL) based techniques have been increasingly applied to MRI reconstruction and have achieved impressive results, but the images obtained using DL techniques are often blurry and lack sharp (e.g., high-frequency) details. Accordingly, systems and methods are desired to improve the quality of DL based MRI image reconstruction.

SUMMARY

Described herein are systems, methods, and instrumentalities associated with MRI reconstruction. An apparatus configured to perform the reconstruction task may obtain a reconstructed MRI image of an anatomical structure such as the human brain, wherein the reconstructed MRI image may be generated (e.g., by the apparatus or another system or device) based on under-sampled MRI data (e.g., an under-sampled MRI image) associated with the anatomical structure. The apparatus may process the reconstructed MRI image through a first artificial neural network that may be trained to implement a generative model for refining the reconstructed MRI image. As a result of the processing, the apparatus may generate a refined MRI image that may include details (e.g., high-frequency details) missing from the original reconstructed image and the refinement may be accomplished without introducing artifacts into the refined image.

In examples, the first artificial neural network may comprise a generative adversarial network (GAN) or an invertible neural network (INN). The GAN may include a generator network and a discriminator network, wherein the generator network may be trained to generate the refined MRI image and the discriminator network may be trained to supervise the generator network so that the refined MRI image may follow (e.g., approximate) a distribution of fully-sampled MRI images of the anatomical structure.

In examples, the generative model described herein may be learned using an instance of the first artificial neural network through a training process that may comprise obtaining a reconstructed MRI training image, predicting, using the instance of the first artificial neural network, an output MRI image based on the reconstructed MRI training image, determining an adversarial loss associated with the prediction, and adjusting the parameters of the instance of the first artificial neural network based on at least the adversarial loss. In examples, the training process may further include determining a pixel-wise loss (e.g., an L1/L2 loss) based on the output MRI image predicted by the instance of the first artificial neural network and a ground truth MRI image, and adjusting the parameters of the instance of the first artificial neural network further based on the pixel-wise loss (e.g., based on a weighted average of the adversarial loss and the pixel-wise loss).

In examples, the apparatus configured to perform the refinement task may also be configured to generate the original reconstructed MRI image based on a machine learned MRI reconstruction model. The apparatus may implement such an MRI reconstruction model through a second artificial neural network and may generate the refined MRI image described herein as a post-processing step of the second artificial neural network.

BRIEF DESCRIPTION OF THE DRAWINGS

A more detailed understanding of the examples disclosed herein may be had from the following description, given by way of example in conjunction with the accompanying drawing.

FIG. 2A is a simplified block diagram illustrating an example of MRI image refinement using a generative model in accordance with one or more embodiments described herein.

FIG. 2B is a simplified block diagram illustrating an example of training a generative model for MRI image refinement in accordance with one or more embodiments described herein.

DETAILED DESCRIPTION

The present disclosure is illustrated by way of example, and not by way of limitation, in the figures of the accompanying drawings.

Figure 1:
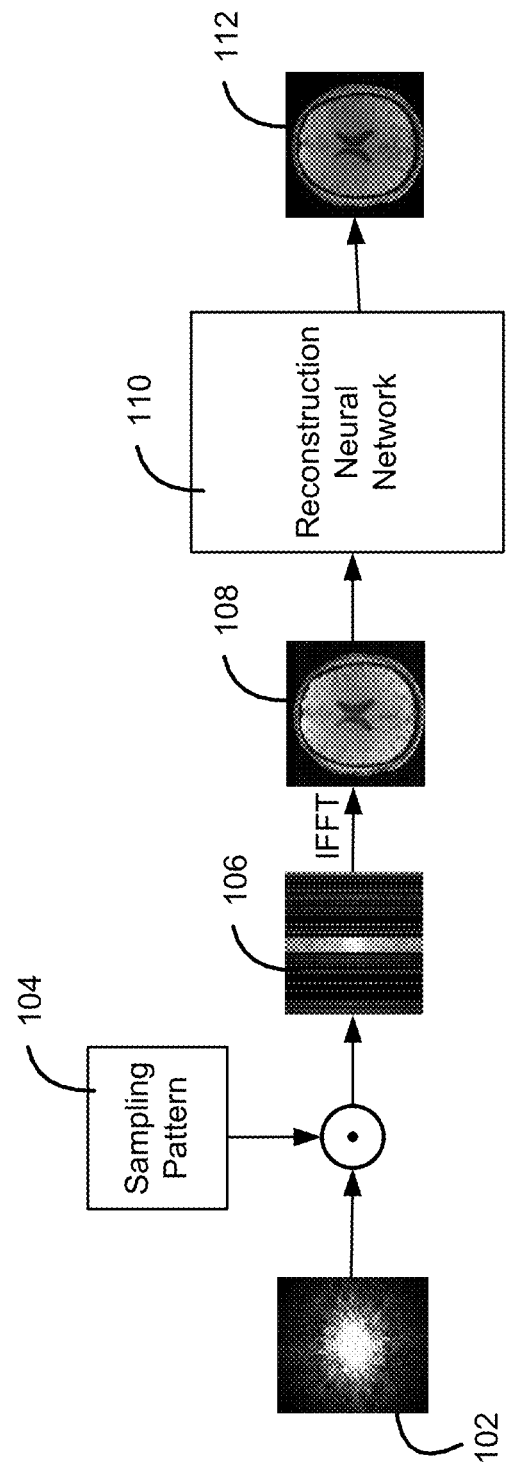
FIG. 1 is a simplified block diagram illustrating example operations that may be associated with MRI image reconstruction in accordance with one or more embodiments describe herein.

FIG. 1 illustrates example operations that may be associated with MRI image reconstruction. As shown, MRI images (e.g., two-dimensional or three-dimensional MRI images) of an anatomical structure (e.g., such as a human brain, human heart, knee, etc.) may be generated based on spatial, frequency, and/or phase information collected by an MRI scanner for the anatomical structure. Such information may be referred to herein as a k-space, k-space data, or k-space information, which may be represented by k-space 102 in the figure. An MRI image (e.g., a fully-sampled MRI image) of the anatomical structure may be generated by fully sampling the k-space. But such a process may be prohibitively slow for clinical purposes. To accelerate the data collection and imaging process, a sampling pattern (e.g., sampling pattern 104 shown in FIG. 1) may be used to under-sample the k-space and under-sampled MRI data 106 may be obtained as a result of the under-sampling. Sampling pattern 104 may include, for example, a sampling mask indicating where in k-space 102 MRI data is to be collected and/or where in k-space 102 MRI data is not to be collected.

Once collected, under-sampled MRI data 106 may be converted into an under-sampled MRI image 108, for example, by applying inverse fast Fourier transform (IFFT) to the under-sampled MRI data. Conversely, based on an under-sampled MRI image, corresponding MRI data may be obtained by applying fast Fourier transform (FFT) to the under-sampled MRI image. Accordingly, the terms "under-sampled MRI data" and "under-sampled MRI image" may be used interchangeably in the examples provided herein without affecting the applicability and scope of the disclosed techniques.

Due to the nature of under-sampling, under-sampled MRI image 108 may lack details and/or may include aliasing artifacts. To recover the missing details and/or reduce the artifacts, under-sampled MRI image 108 may be subject to an image reconstruction process, for example, utilizing an MRI image reconstruction neural network (e.g., 110 shown in FIG. 1) trained to generate a refined MRI image (e.g., reconstructed image 112) based on information extracted from under-sampled MRI image 108.

In examples, reconstruction neural network 110 may include a convolutional neural network comprising a plurality of convolutional and/or transposed convolutional layers. The convolutional layers may each include a plurality of convolution kernels or filters having respective weights (e.g., corresponding to the parameters of a machine learning (ML) implemented by the neural network) that may be configured to extract features from under-sampled MRI image 108. The convolution operations of each convolutional layer may be followed by batch normalization and/or an activation function (e.g., such as a rectified linear unit (ReLu) activation function), and the features extracted by each convolutional layer may be down-sampled through one or more pooling layers and/or one or more fully connected layers to obtain a representation of the features, e.g., in the form of a feature map or a feature vector.

In examples, the features representation determined by the reconstruction neural network may be passed to one or more un-pooling layers and one or more transposed convolutional layers. Through those un-pooling layers and/or transposed convolutional layers, the features included in the feature representation may be up-sampled and further processed (e.g., via a plurality of deconvolution operations) to derive an up-scaled or dense feature map or feature vector. The dense feature map or vector may then be used to generate (e.g., through an output layer of the reconstruction neural network 110) reconstructed MRI image 112 shown in FIG. 1.

Through the aforementioned reconstruction process, unmeasured information may be filled into reconstructed MRI image 112, for example, based on available measurements contained in under-sampled MRI data 106. The quality of the reconstructed image, however, may still be sub-optimal compared to a fully-sampled MRI image (e.g., the reconstructed image may be blurry or not as sharp as a fully-sampled MRI image due to lack of high-frequency details). The degradation in quality may be more prominent if reconstruction neural network 112 is trained with a main objective to achieve a pixel-wise accuracy because such training techniques may lead to an averaging of multiple potential solutions and therefore may over-smooth the reconstruction.

FIGS. 2A and 2B illustrate example techniques for improving the quality of MRI image reconstruction. As shown in FIG. 2A, a machine learned generative model (e.g., 202 shown in the figure) may be used to process a reconstructed MRI image (e.g., image 204 of the figure) of an anatomical structure (e.g., a human brain) and generate a refined (e.g., sharpened) MRI image 206 of the anatomical structure as a result of the processing. Reconstructed MRI image 204 may be generated based on under-sampled MRI data, for example, using the techniques described with reference to FIG. 1. The reconstructed MRI image may be obtained as part of the same process or neural network that refines the MRI image (e.g., the reconstructed image may be produced by a large neural network trained for both image reconstruction and image sharpening) or the reconstructed MRI image may be obtained from a separate process or neural network than that used for image refinement (e.g., the reconstructed image may be obtained from an image reconstruction network separately trained and/or implemented from the neural network used to implement generative model 202). As described in greater detail below, using reconstructed MRI image 204 (e.g., instead of an under-sampled MRI image) as the input image to generative model 202 may prevent the generative model from also enhancing the artifacts (e.g., aliasing artifacts) that may be contained in the input image (e.g., an under-sampled MRI image may include more aliasing artifacts than a reconstructed image). As a result, an MRI image generated using the technique illustrated in FIG. 2A may have a better quality (e.g., in terms of high-frequency details) than MRI images generated using conventional techniques (e.g., which may attempt to generate an improved MRI image directly based on an under-sampled MRI image).

When referred to herein, a generative model (e.g., generative model 202 of FIG. 2A) may refer to a machine learning model trained to learn the probability distribution of a large number of samples (e.g., a large number of fully-sampled MRI images), and create a new sample (e.g., a new MRI image) that approximates the probability distribution. Such a generative model may be implemented using an artificial neural network (ANN) and may be learned using an instance of the ANN, for example, through a training process. Various types of neural networks may be used to implement and/or train the generative model including, e.g., a generative adversarial network (GAN) or an invertible neural network (INN). For example, the generative model 202 shown in FIG. 2A may be implemented using a conditional GAN (cGAN) that may include a generator network and a discriminator network. The generator network may be trained to generate new samples such as refined (e.g., sharpened) MRI images, and the discriminator network may be trained to classify the samples as real samples (e.g., real, fully-sampled MRI images) or fake samples (e.g., generated or synthetic MRI images). The two networks may be trained together in a zero-sum game (e.g., based on an adversarial loss), for example, until the discriminator network is fooled about half the time by the samples generated by the generator network (e.g., making a classification decision on a generated sample that has a 50-50 chance of being correct), which may indicate that the generator network has been trained to generate plausible samples (e.g., realistic MRI images). The GAN used to implement the generative model is referred to herein as a conditional GAN because the samples generated by the generator network may be restricted by the reconstructed MRI image 204 (e.g., the refine MRI image 206 may improve upon the reconstructed MRI image 204 but should still resemble the reconstructed MRI image 204), and, as such, may be deemed as being conditioned on the reconstructed MRI image 204.

In examples, either or both of the generator and discriminator networks of the cGAN may include a convolutional neural network as described herein (e.g., having a plurality of hidden layers such as convolutional and/or transposed convolutional layers, pooling/un-pooling layers, and/or fully-connected layers, and a leaky ReLU activation function). The generator network may be trained to transform (e.g., via a plurality of convolution and/or de-convolution operations) a random input (e.g., from a latent space) into a refined (e.g., sharpened) MRI image, for example, by predicting and filling in high-frequency details for the image, while the discriminator network may be trained to receive the image created by the generator and output a binary prediction as to whether the image is real (e.g., class=1) or fake (e.g., class=0). In a way, the discriminator network supervises the generator network to ensure that the refined MRI image predicted by the generator follow (e.g., approximate) a distribution of fully-sampled MRI images that the GAN may learn through training.

The refinement operation described herein may be performed as a post-processing step for MRI image reconstruction. For example, the GAN or INN described herein may be attached to or included as a part of an MRI reconstruction network to refine (e.g., sharpen) an MRI image (e.g., reconstructed image 204) generated by the reconstruction network, before passing the image for down-stream analyses or studies. Since the focus of the GAN or INN may be on refining (e.g., sharpening) an already reconstructed MRI image, the size of the network may be small, which may lead to improved training and/or inference speeds. Using the reconstructed MRI image instead of an under-sampled MRI image as an input to the generative model may also eliminate or reduce the likelihood that artifacts may be enhanced in and/or introduced to the output MRI image due to the generative nature of model.

FIG. 2B illustrates example operations that may be associated with training the generative model described herein. As shown, the training may be conducted using pairs of reconstructed MRI training images 224 and ground truth images 228 (e.g., fully-sampled images), and based on one or more of an adversarial loss or a pixel-wise image loss (e.g., based on all pixels in the images or a selected number of pixels in the images). For example, during a training iteration, a reconstructed MRI training image may be provided to an artificial neural network (ANN) configured to implement the generative model and the ANN (e.g., a generator network of the ANN) may predict, using presently assigned parameters or weights of the network, a refined (e.g., sharpened) MRI image (e.g., image 226 of FIG. 2B) based on the reconstructed MRI training image. One or more losses associated with the prediction may then be determined and used to update the parameters of the ANN. For instance, the losses may include an adversarial loss and a pixel-wise loss. The adversarial loss may be represented by the following equation, which the generator of the ANN may be configured to minimize and the discriminator of the ANN may be configured to maximize:

$$L(D,G)=E_x[\log(D(x))]+E_z[\log(1-D(G(z)))] \quad (1)$$

where $D(x)$ may represent the discriminator's estimate of the probability that a real image x is real, $E_x$ may represent an expected value over all real instances, $G(z)$ may represent the generator's output when given a random input (e.g., noise) z, $D(G(z))$ may represent the discriminator's estimate of the probability that a fake image is real, and $E_z$ may represent the expected value over all random inputs to the generator (e.g., the expected value over all generated fake images $G(z)$).

The pixel-wise loss described herein may be determined by comparing the MRI image predicted by the ANN with a ground truth image (e.g., by comparing all pixels of the images or a selected number of pixels of the images), and calculating a difference between the predicted image and the ground truth image. The ground truth image may be a fully-sampled MRI image, and the difference may be calculated, for example, based on an L1 loss, an L2 loss, or mean squared errors (MSE) between the two images. Once determined, the pixel-wise loss may be used in conjunction with the adversarial loss to adjust the parameters of the ANN. For example, a weighted average of the pixel-wise loss and the adversarial loss may be determined and the parameters of the ANN may be updated by backpropagating the average loss through the ANN. The respective weights assigned to the adversarial loss and the pixel-wise loss may be tuned to increase the sharpness of a predicted image without introducing additional artifacts.

As shown in FIGS. 2A and 2B, generative model 202 (e.g., the ANN used to implement the generative model) may be trained to take a reconstructed MRI image as an input and output a refined (e.g., sharpened) image based on information (e.g., features) extracted from the reconstructed MRI image. The output image thus obtained may be characterized by improved quality over the original reconstructed image. For example, the output image may contain more high-frequency details than the original reconstructed image and may therefore be less blurry than the original reconstructed image. At the same time, since the input image is already a reconstructed image and, as such, may include fewer artifacts than an under-sampled MRI image, the output image generated using the design and training techniques illustrated by FIGS. 2A and 2B may also include fewer artifacts than if the input image were an under-sampled MRI image.

Further, even though the generative model may have been described herein using a GAN (e.g., a conditional GAN) as the implementing neural network, the generative model may also be implemented using other types of neural networks. 3. For example, in embodiments, the generative model may be implemented via an invertible neural network (INN) and by taking advantage of the characteristics of the INN including, for example, improved training stability, better interpretability, and fewer representation errors.

Figure 3:
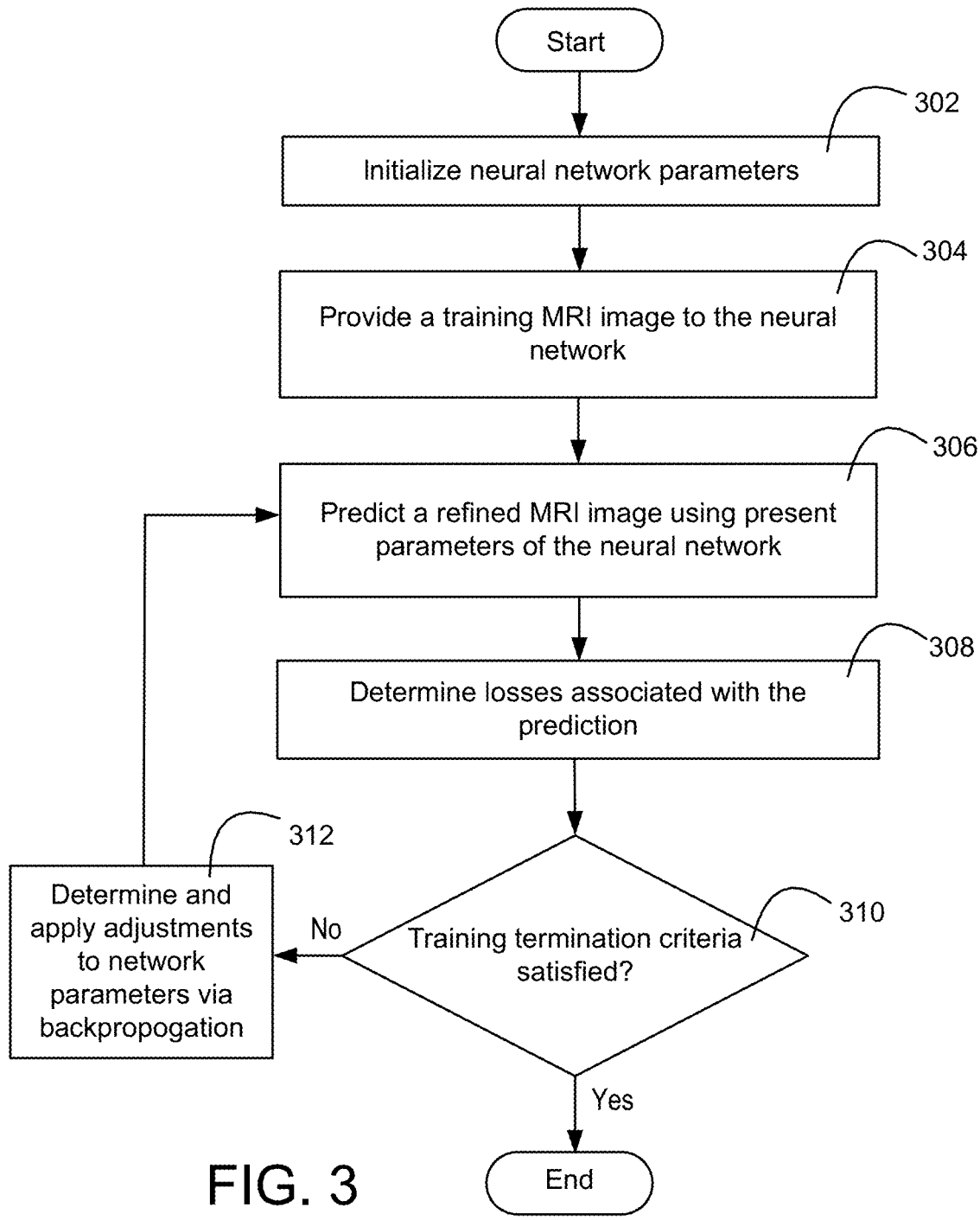
FIG. 3 is a simplified block diagram illustrating an example process for training an artificial neural network to perform the MRI image reconstruction and/or refinement tasks described in one or more embodiments provided herein.

FIG. 3 illustrates an example process for training an artificial neural network (e.g., the GAN described in association with FIGS. 2A and 2B) to perform the image refinement task described herein. As shown, the training process may include initializing parameters of the neural network (e.g., weights associated with the various filters or kernels of the neural network) at 302, for example, based on samples from one or more probability distributions or parameter values of another neural network having a similar architecture. The training process may further include providing an MRI training image (e.g., an MRI image reconstructed from under-sampled MRI data) to the neural network at 304, and causing the neural network to predict, using present parameters of the network, a refined MRI image at 306. Subsequently, at 308, one or more losses associated with the prediction may be determined based on the predicted MRI image and a ground truth image. As described herein, these losses may include, for example, an adversarial loss and/or a pixel-wise image loss that may be used to adjust the parameters of the neural network. For example, once determined, the losses may be evaluated at 310, e.g., individually or as a combined loss (e.g., as a weighted average of the determined losses), to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 310 is that a training termination criterion has been satisfied, the training may end. Otherwise, the losses may be backpropagated (e.g., individually or as a combined loss) through the neural network (e.g., based on respective gradient descents associated with the losses or the gradient descent of the combined loss) at 312 before the training returns to 306.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 4:
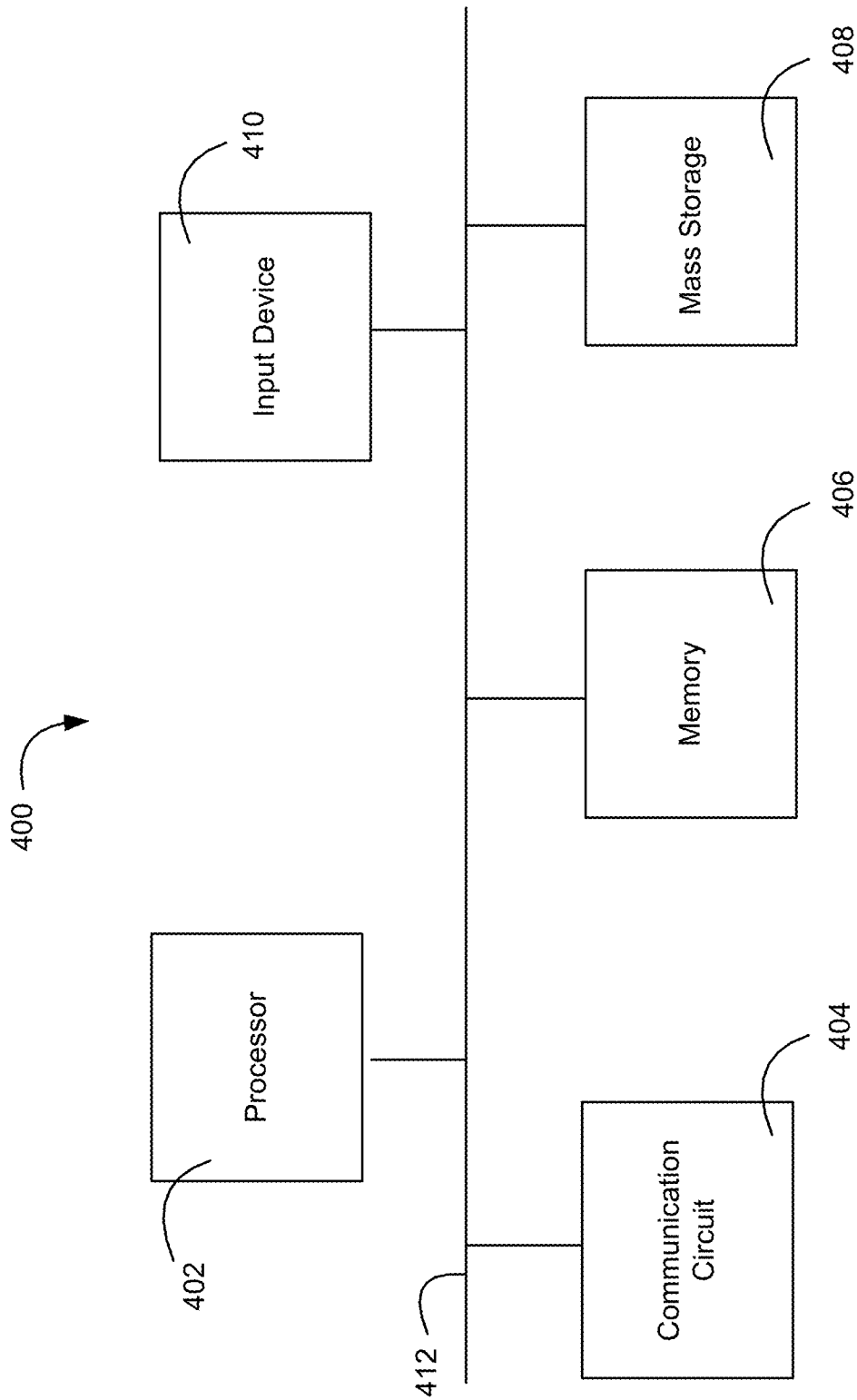
FIG. 4 is a simplified block diagram illustrating example components of an apparatus that may be configured to perform the MRI image reconstruction and/or refinement tasks described in one or more embodiments provided herein.

The systems, methods, and/or instrumentalities described herein may be implemented using one or more processors, one or more storage devices, and/or other suitable accessory devices such as display devices, communication devices, input/output devices, etc. FIG. 4 is a block diagram illustrating an example apparatus 400 that may be configured to perform the joint sampling and reconstruction tasks described herein. As shown, apparatus 400 may include a processor (e.g., one or more processors) 402, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 400 may further include a communication circuit 404, a memory 406, a mass storage device 408, an input device 410, and/or a communication link 412 (e.g., a communication bus) over which the one or more components shown in the figure may exchange information.

Communication circuit 404 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 406 may include a storage medium (e.g., a non-transitory storage medium) configured to store machine-readable instructions that, when executed, cause processor 402 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 408 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 402. Input device 410 may include a keyboard, a mouse, a voice-controlled input device, a touch sensitive input device (e.g., a touch screen), and/or the like for receiving user inputs to apparatus 400.

It should be noted that apparatus 400 may operate as a standalone device or may be connected (e.g., networked, or clustered) with other computation devices to perform the functions described herein. And even though only one instance of each component is shown in FIG. 4, a skilled person in the art will understand that apparatus 400 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   one or more processors configured to:
   obtain a reconstructed magnetic resonance imaging (MRI) image of an anatomical structure, wherein the reconstructed MRI image is generated based on under-sampled MRI data associated with the anatomical structure and using a first artificial neural network trained for generating the reconstructed MRI image based on the under-sampled MRI data; and
   process the reconstructed MRI image through a second artificial neural network, wherein the second artificial neural network comprises a generator network and a discriminator network, the generator network is used to refine the reconstructed MRI image of the anatomical structure, the discriminator network is used to supervise the generator network, and a refined MRI image of the anatomical structure is generated as a result of the processing, the refined MRI image characterized by an improved sharpness over the reconstructed MRI image.

2. The apparatus of claim 1, wherein the second artificial neural network comprises a generative adversarial network (GAN).

3. The apparatus of claim 1, wherein the discriminator network is trained to supervise the generator network so that the refined MRI image generated by the generator network follows a probability distribution of fully-sampled MRI images of the anatomical structure.

4. The apparatus of claim 1, wherein the second artificial neural network is trained through a training process that comprises:
   obtaining a reconstructed MRI training image, wherein the reconstructed MRI training image is generated based on under-sampled MRI training data;
   predicting, using an instance of the second artificial neural network, an output MRI image based on the reconstructed MRI training image;
   determining an adversarial loss associated with the prediction; and
   adjusting parameters of the instance of the second artificial neural network based on at least the adversarial loss.

5. The apparatus of claim 4, wherein the training process further comprises determining an additional training loss based on the output MRI image and a ground truth MRI image, and adjusting the parameters of the instance of the second artificial neural network further based on the additional training loss.

6. The apparatus of claim 5, wherein the parameters of the instance of the second artificial neural network are adjusted based on a weighted average of the adversarial loss and the additional training loss.

7. The apparatus of claim 6, wherein respective weights assigned to the adversarial loss and the pixel-wise loss are adjusted during the training process to balance between a sharpness and a level of artifacts in an image produced by the second artificial neural network.

8. The apparatus of claim 5, wherein the ground truth MRI image is a fully sampled MRI image.

9. The apparatus of claim 1, wherein the first artificial neural network and the second artificial neural network are trained together in an end-to-end manner.

10. A method of magnetic resonance imaging (MRI) reconstruction, the method comprising:
   obtaining a reconstructed magnetic resonance imaging (MRI) image of an anatomical structure, wherein the reconstructed MRI image is generated based on under-sampled MRI data associated with the anatomical structure and using a first artificial neural network trained for generating the reconstructed MRI image based on the under-sampled MRI data; and
   processing the reconstructed MRI image through a second artificial neural network, wherein the second artificial neural network comprises a generator network and a discriminator network, the generator network is used to refine the reconstructed MRI image of the anatomical structure, the discriminator network is used to supervise the generator network, and a refined MRI image of the anatomical structure is generated as a result of the processing, the refined MRI image characterized by an improved sharpness over the reconstructed MRI image.

11. The method of claim 10, wherein the second artificial neural network comprises a generative adversarial network (GAN).

12. The method of claim 10, wherein the discriminator network is trained to supervise the generator network so that the refined MRI image follows a probability distribution of fully-sampled MRI images of the anatomical structure.

13. The method of claim 10, wherein the second artificial neural network is trained through a training process that comprises:
   obtaining a reconstructed MRI training image, wherein the reconstructed MRI training image is generated based on under-sampled MRI training data;
   predicting, using an instance of the second artificial neural network, an output MRI image based on the reconstructed MRI training image;
   determining an adversarial loss associated with the prediction; and
   adjusting parameters of the instance of the second artificial neural network based on at least the adversarial loss.

14. The method of claim 13, wherein the training process further comprises determining an additional training loss based on the output MRI image and a ground truth MRI image, and adjusting the parameters of the instance of the second artificial neural network further based on the additional training loss.

15. The method of claim 14, wherein the parameters of the instance of the second artificial neural network are adjusted based on a weighted average of the adversarial loss and the additional training loss.

16. The method of claim 15, wherein respective weights assigned to the adversarial loss and the pixel-wise loss are adjusted during the training process to balance between a sharpness and a level of artifacts in an image produced by the second artificial neural network.

17. The method of claim 14, wherein the ground truth MRI image is a fully sampled MRI image.

18. The method of claim 10, wherein the first artificial neural network and the second artificial neural network are trained together in an end-to-end manner.

* * * * *